United States Patent

Okuyama

(10) Patent No.: US 10,077,002 B2
(45) Date of Patent: Sep. 18, 2018

(54) CONTROL DEVICE OF ELECTRIC STEP FOR VEHICLE

(71) Applicant: MITSUI KINZOKU ACT CORPORATION, Yokohama-shi, Kanagawa (JP)

(72) Inventor: Keiichiro Okuyama, Yokohama (JP)

(73) Assignee: MITSUI KINZOKU ACT CORPORATION, Yokohama-shi (JP)

( * ) Notice: Subject to any disclaimer, the term of this patent is extended or adjusted under 35 U.S.C. 154(b) by 0 days.

(21) Appl. No.: 15/649,882

(22) Filed: Jul. 14, 2017

(65) Prior Publication Data

US 2018/0043832 A1 Feb. 15, 2018

(30) Foreign Application Priority Data

Aug. 12, 2016 (JP) .................................. 2016-158842

(51) Int. Cl.
*B60R 3/02* (2006.01)
*B60R 3/00* (2006.01)

(52) U.S. Cl.
CPC ................ *B60R 3/02* (2013.01); *B60R 3/002* (2013.01)

(58) Field of Classification Search
CPC .................................... B60R 3/02; B60R 3/002
See application file for complete search history.

(56) References Cited

U.S. PATENT DOCUMENTS

| | | | |
|---|---|---|---|
| 2004/0108678 A1* | 6/2004 | Berkebile | B60R 3/002 280/166 |
| 2009/0008895 A1* | 1/2009 | Casbolt | B60R 3/02 280/166 |
| 2010/0194070 A1* | 8/2010 | Stauffer | B60R 3/002 280/166 |
| 2015/0123374 A1* | 5/2015 | Smith | B60R 3/02 280/166 |
| 2015/0274079 A1* | 10/2015 | Yang | B60R 3/02 280/166 |
| 2016/0237733 A1* | 8/2016 | Henseleit | B60J 5/047 |
| 2017/0174138 A1* | 6/2017 | Fortin | B60R 3/02 |
| 2017/0274828 A1* | 9/2017 | Woodhouse | B60R 3/02 |
| 2017/0341585 A1* | 11/2017 | Stickles | B60R 3/02 |
| 2017/0355315 A1* | 12/2017 | Leitner | B60R 3/02 |

FOREIGN PATENT DOCUMENTS

JP 2013-028222 A 2/2013

* cited by examiner

*Primary Examiner* — Erez Gurari
(74) *Attorney, Agent, or Firm* — Foley & Lardner LLP

(57) ABSTRACT

An electric step control device for a vehicle having a step provided movably by power of a motor from a retraction position where the step is retracted under a vehicle body to an overhang position where the step appears from the vehicle body or vice versa according to an opening and closure operation of a door, has a control unit. The control unit executes an overhang drive control that moves the step from the retraction position to the overhang position according to an occurrence of the opening operation of the door having been at a closure position. And the control unit starts a retraction drive control that moves the step from the overhang position to the retraction position according to an occurrence of the closure operation of the door having been at a full open position at a predetermined timing before the door reaches the closure position.

9 Claims, 11 Drawing Sheets

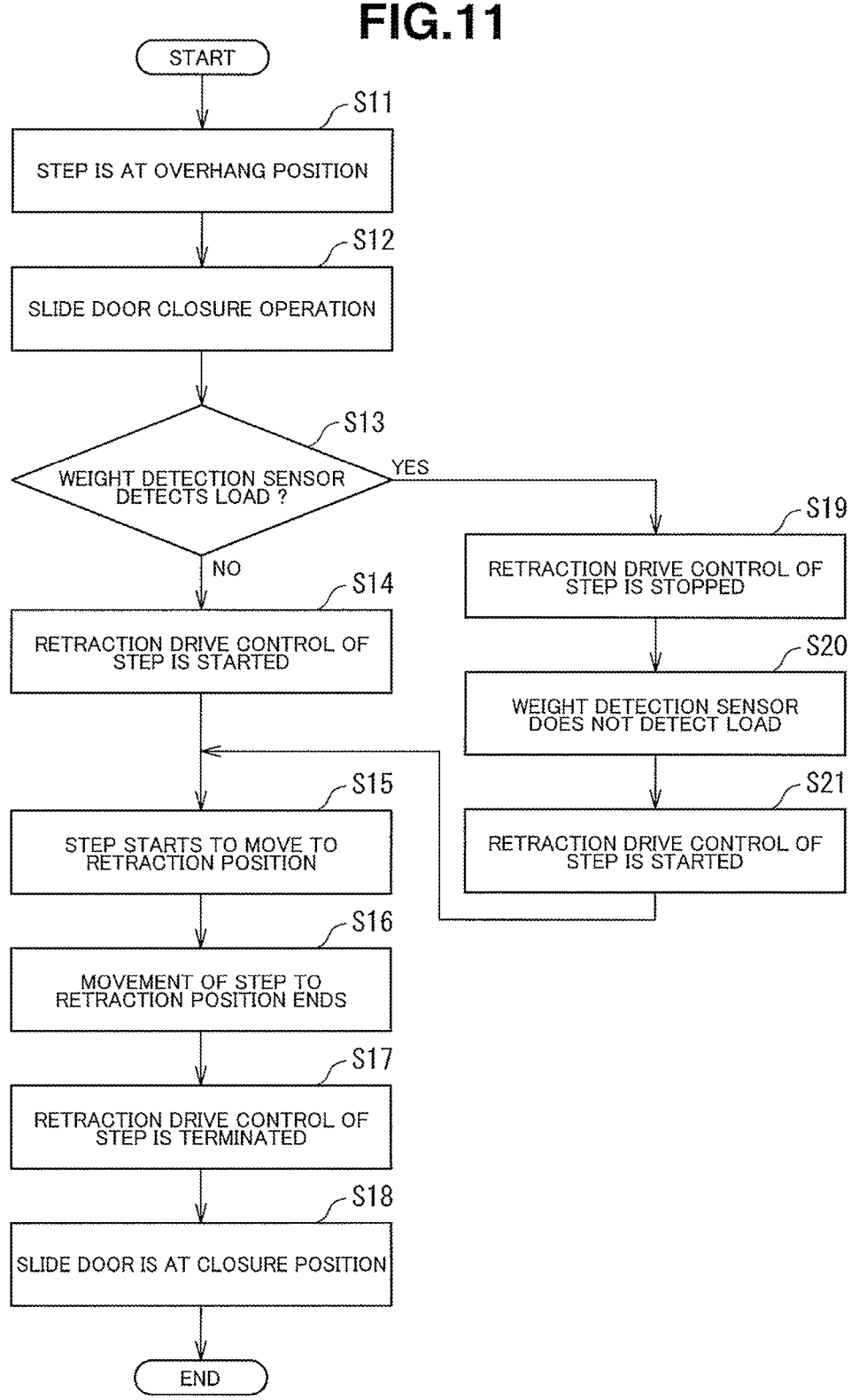

CONTROL DEVICE OF ELECTRIC STEP FOR VEHICLE

BACKGROUND OF THE INVENTION

The present invention relates to a control device of an electric step, which can move according to opening and closing movement of a door, for a vehicle.

A control device of an electric step for a vehicle has a configuration in which, in order to assist a passenger in getting on or out of the vehicle, the step having been retracted under a vehicle body (under a floor of a vehicle body) appears by opening a slide door that opens and closes an entrance provided on a side surface of the vehicle body, and the step is retracted under the vehicle body by closing the slide door. Such an electric step control device is disclosed, for instance, in Japanese Patent Provisional Publication No. 2013-028222 (hereinafter is referred to as "JP2013-028222").

SUMMARY OF THE INVENTION

In the vehicle electric step control device disclosed in JP2013-028222, however, when closing the slide door, a start timing of a retraction drive control that moves the step from an overhang position (or a protruding position) (a position where the step appears from a space under the vehicle body) to a retraction position (a position where the step is retracted under the vehicle body) is a timing at which a closure position of the slide door is detected. Because of this, there might arise a case where a movement of the step to the retraction position is not completed even after the slide door is closed. If the vehicle stars in this state, there is a risk that the step will collide with obstructions such as a curb of a road.

The present invention was made in view of the above problem. An object of the present invention is therefore to provide a vehicle electric step control device that is capable of preventing the step from colliding with the obstructions at a vehicle start.

According to one aspect of the present invention, an electric step control device for a vehicle, the vehicle having a step provided movably by power of a motor from a retraction position where the step is retracted under a vehicle body to an overhang position where the step appears from the vehicle body or vice versa according to an opening and closure operation of a door, the control device comprises: a control unit configured to execute an overhang drive control that moves the step from the retraction position to the overhang position by the power of the motor according to an occurrence of the opening operation of the door having been at a closure position, and start a retraction drive control that moves the step from the overhang position to the retraction position by the power of the motor according to an occurrence of the closure operation of the door having been at a full open position at a predetermined timing before the door reaches the closure position.

According to the present invention, the step can move to the retraction position before the door reaches the closure position. It is therefore possible to prevent the step from colliding with the obstructions at a vehicle start.

The other objects and features of this invention will become understood from the following description with reference to the accompanying drawings.

BRIEF DESCRIPTION OF THE DRAWINGS

FIG. 11 is a flow chart to explain a retraction drive control.

DETAILED DESCRIPTION OF THE INVENTION

Embodiments of the present invention will now be explained below with reference to the drawings.

Figure 1:
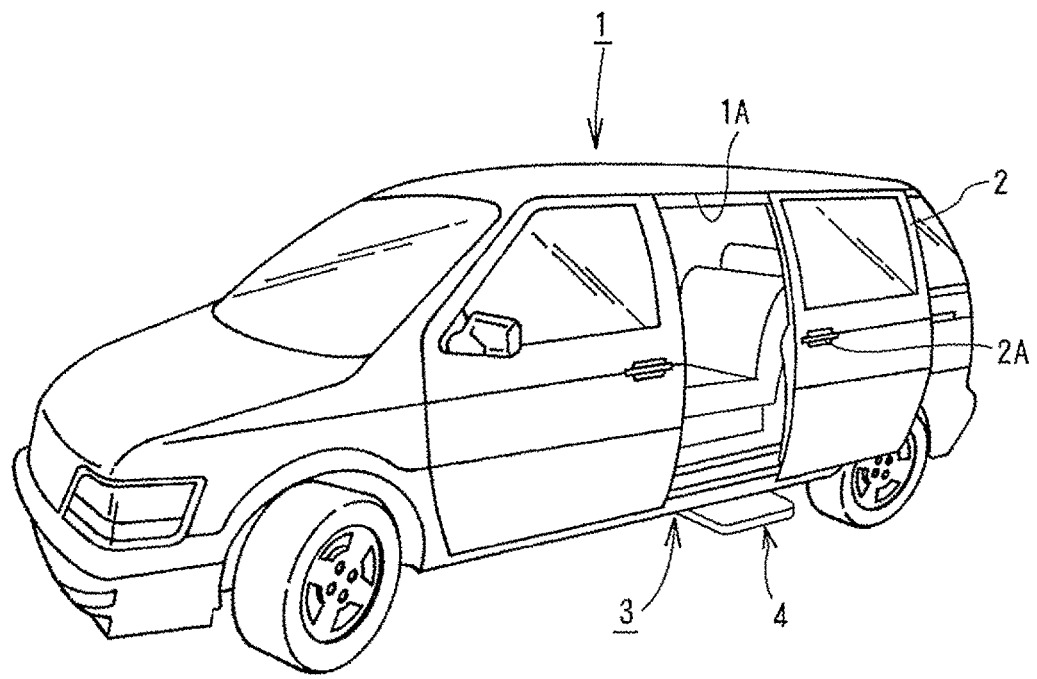
FIG. 1 is a perspective view of a vehicle to which the present invention is applied.

As shown in FIG. 1, a vehicle 1 of the present embodiment has a slide door 2 that can open and close an entrance 1A provided on a side surface of a vehicle body and an electric step device 3 having a step 4 that can move, according to opening and closure of the slide door 2, from a retraction position where the step 4 is retracted under the vehicle body to an overhang position (or a protruding position, shown in FIG. 1) where the step 4 appears at a bottom side of the entrance 1A, or vice versa. The electric step device 3 is a device that assists a passenger in getting on or out of the vehicle by reducing a step of the entrance 1A by moving the step 4 to the overhang position when the slide door 2 is opened.

The slide door 2 is supported slidably in front and rear directions on the side surface of the vehicle body. The slide door 2 can move to open and close by power of a door motor M1 (see FIG. 9) of an electric door opening and closing device (not shown) mounted in the vehicle.

The electric door opening and closing device has the door motor M1 and a cable (not shown) wound around a rotation drum (not shown) whose rotation decelerates by the door motor M1 and connecting to the slide door 2. The electric door opening and closing device achieves a sliding movement of the slide door 2 by transmitting the power of the door motor M1 to the slide door 2 through the rotation drum and the cable. Since this kind of electric door opening and closing device is well known as disclosed in, for instance, Japanese Patent Provisional Publication No. 2006-328787, its detailed explanation is omitted here.

The slide door 2 is provided with a door lock device (not shown) that holds the slide door 2 to a closure position by engaging with a striker (not shown) provided on the vehicle body side, an outside door operation handle 2A that is operated when the slide door 2 is opened and an inside door operation handle (not shown). Either one of the door lock device or the vehicle body is provided with a door opening and closure detection switch SW1 (see FIG. 9) for detecting opening and closure of the slide door 2. The outside door operation handle 2A (including the inside door operation handle) is provided with a handle operation detection switch SW2 for detecting the door opening and closure operation. A detection signal detected by each of the door opening and closure detection switch SW1 and the handle operation detection switch SW2 is sent to a control device (a control unit) 100.

Figure 2:
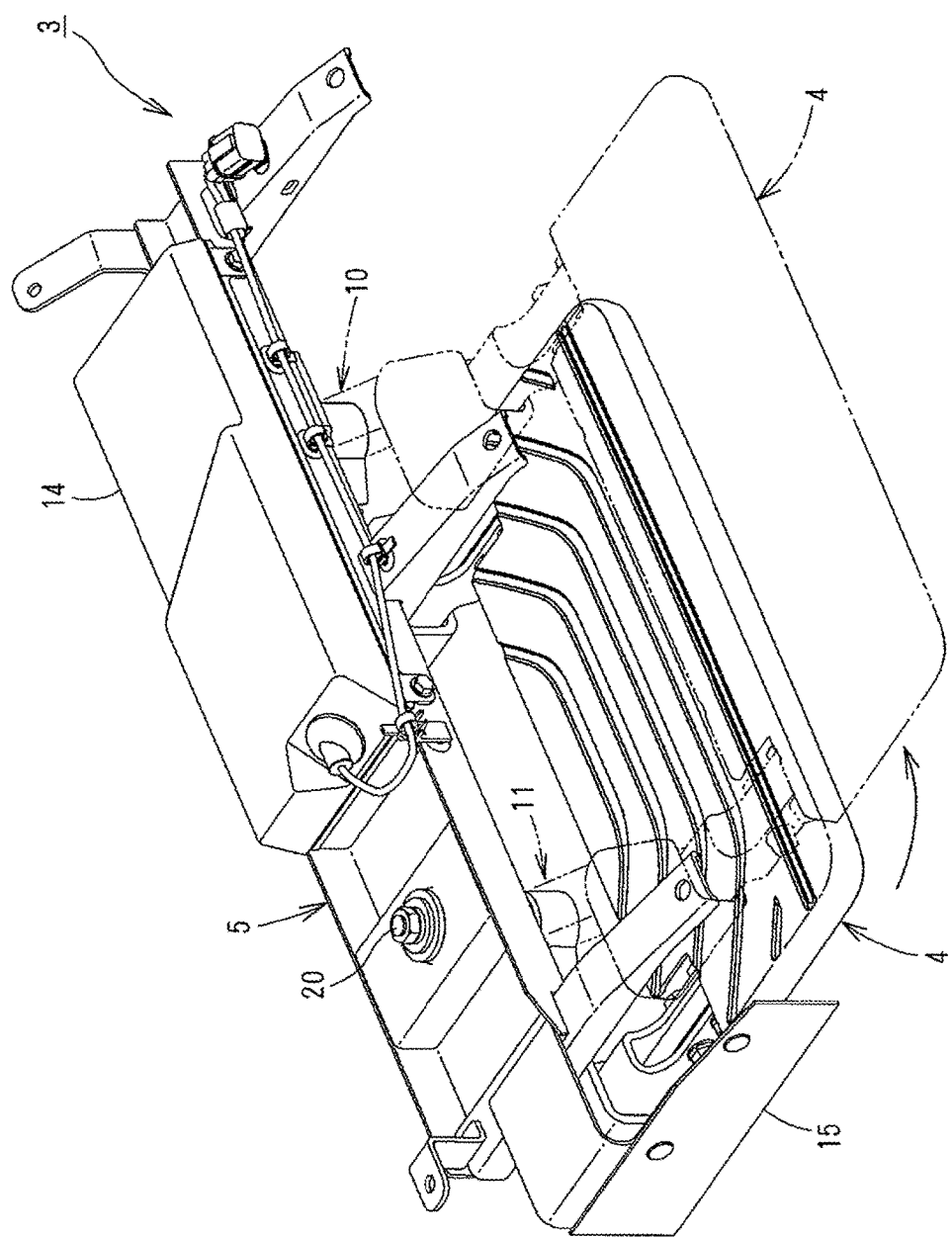
FIG. 2 is a perspective view of an electric step device.
Figure 3:
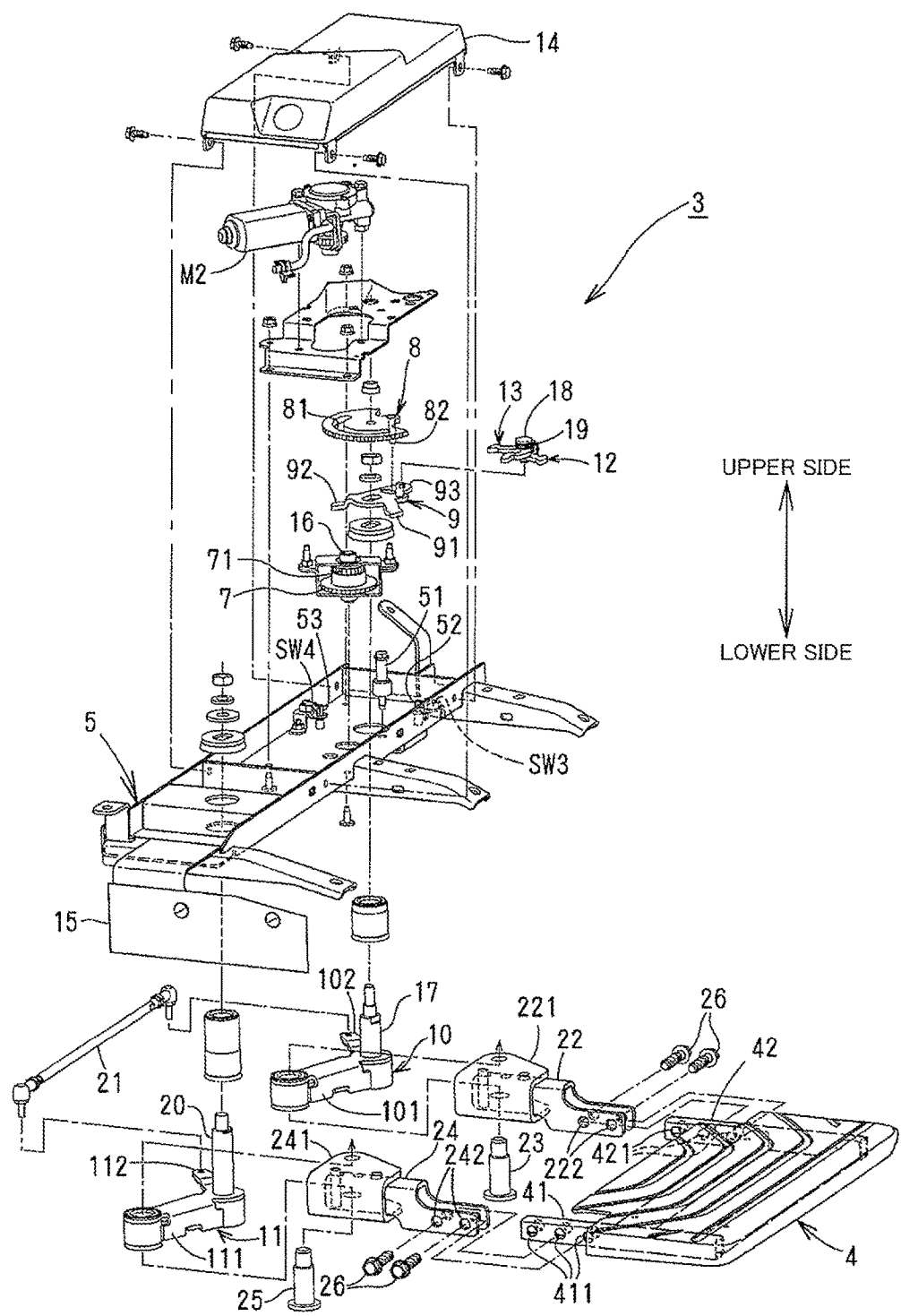
FIG. 3 is a perspective exploded view of the electric step device.

FIG. 2 is a perspective view of the electric step device 3. FIG. 3 is a perspective exploded view of the electric step device 3. As shown in FIGS. 2 and 3, the electric step device 3 has a base plate 5 secured to a lower side of a vehicle body floor with bolts (not shown), a motor M2 for the step 4 (hereinafter described as "step motor M2") as a power source, an idle gear 7 engaging with an output gear 6 (see FIGS. 7 and 8) that rotates on a shaft extending in an up-and-down direction (a vertical direction) by the step motor M2, a sector gear 8 engaging with a small diameter gear portion 71 that rotates integrally with the idle gear 7, a revolution lever 9 revolving while interlocking with (or working with, or working in concert with) the sector gear 8 in a rotation direction with predetermined play, a first link 10 revolving integrally with the revolution lever 9, a second link 11 revolving in synchronization with the first link 10, the step 4 provided movably, by revolution of the first and second links 10 and 11, from the retraction position (a position shown by a solid line in FIG. 2) where the step 4 is retracted under the vehicle body to the overhang position (a position shown by a solid line in FIG. 1 and shown by a two-dot chain line in FIG. 2) where the step 4 appears from the lower side of the vehicle body floor, or vice versa, a retraction interlock lever 12 subserviently or supplementarily restraining (or holding) the step 4 to the retraction position, an overhang interlock lever 13 subserviently or supplementarily restraining (or holding) the step 4 to the overhang position, a retraction interlock detection switch SW3 detecting the retraction position of the step 4 through the retraction interlock lever 12 and an overhang interlock detection switch SW4 detecting the overhang position of the step 4 through the overhang interlock lever 13.

Figure 4:
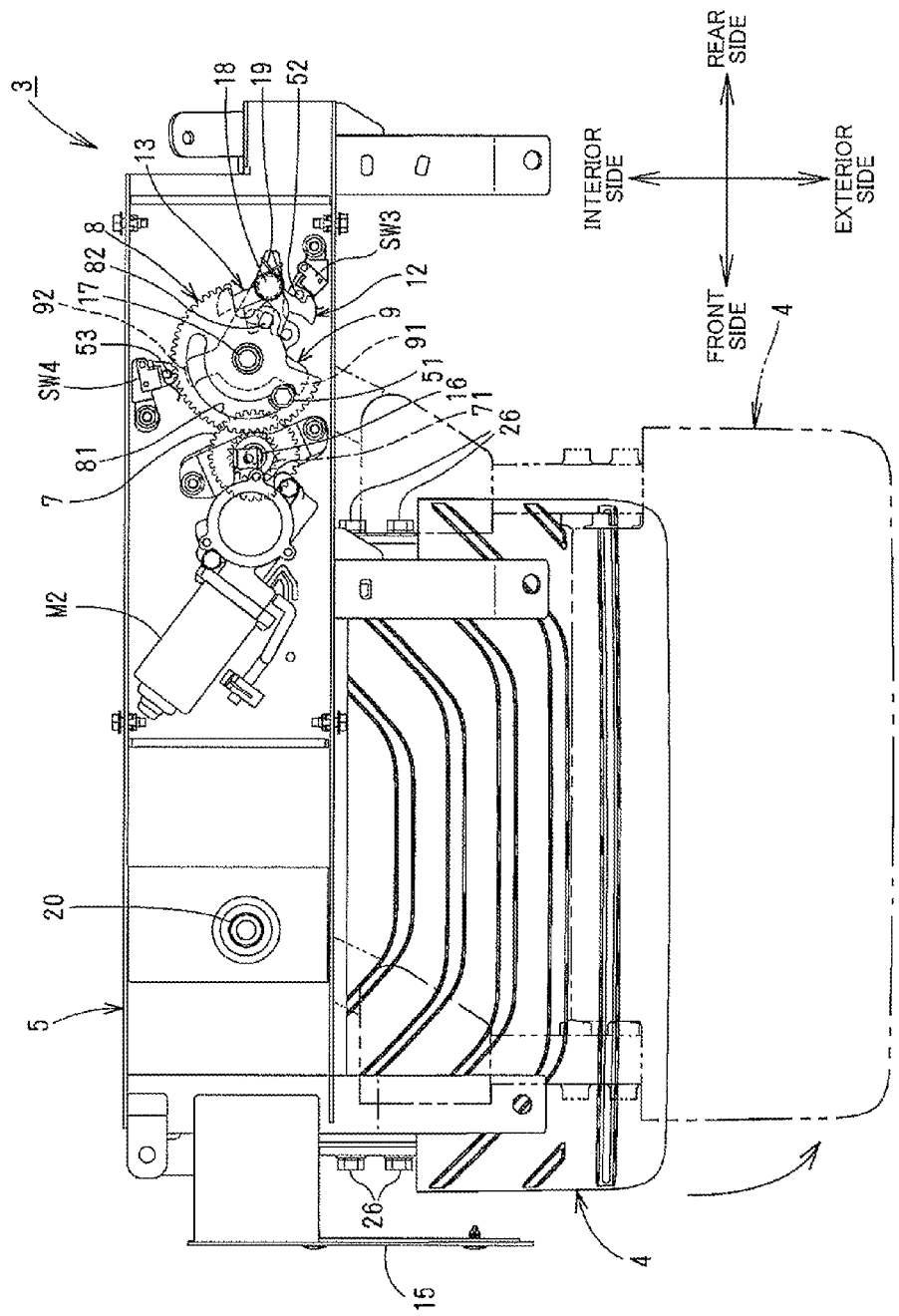
FIG. 4 is a plan view of the electric step device.
Figure 5:
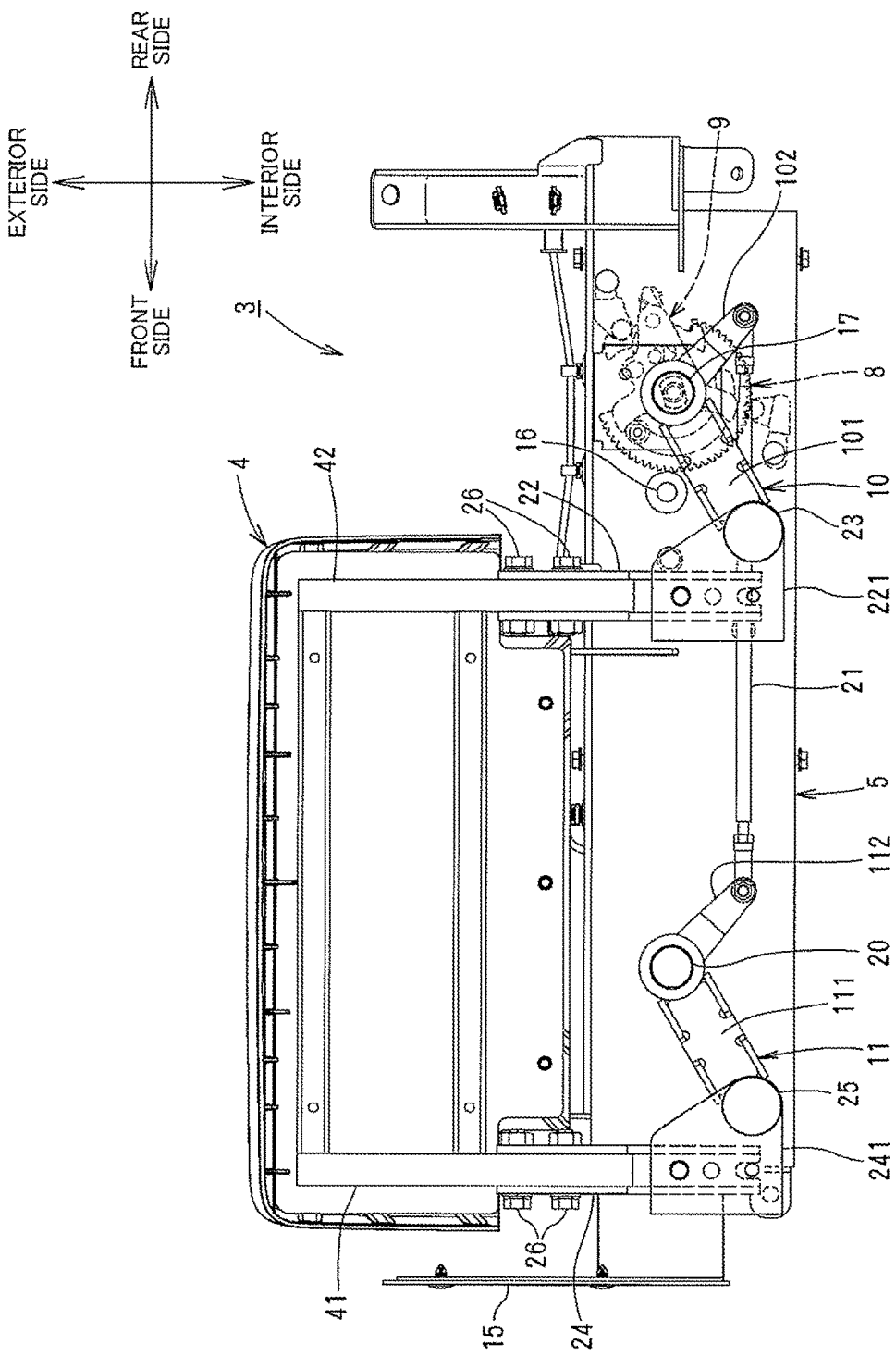
FIG. 5 is a bottom view of the electric step device when the step is positioned at a retraction position.
Figure 6:
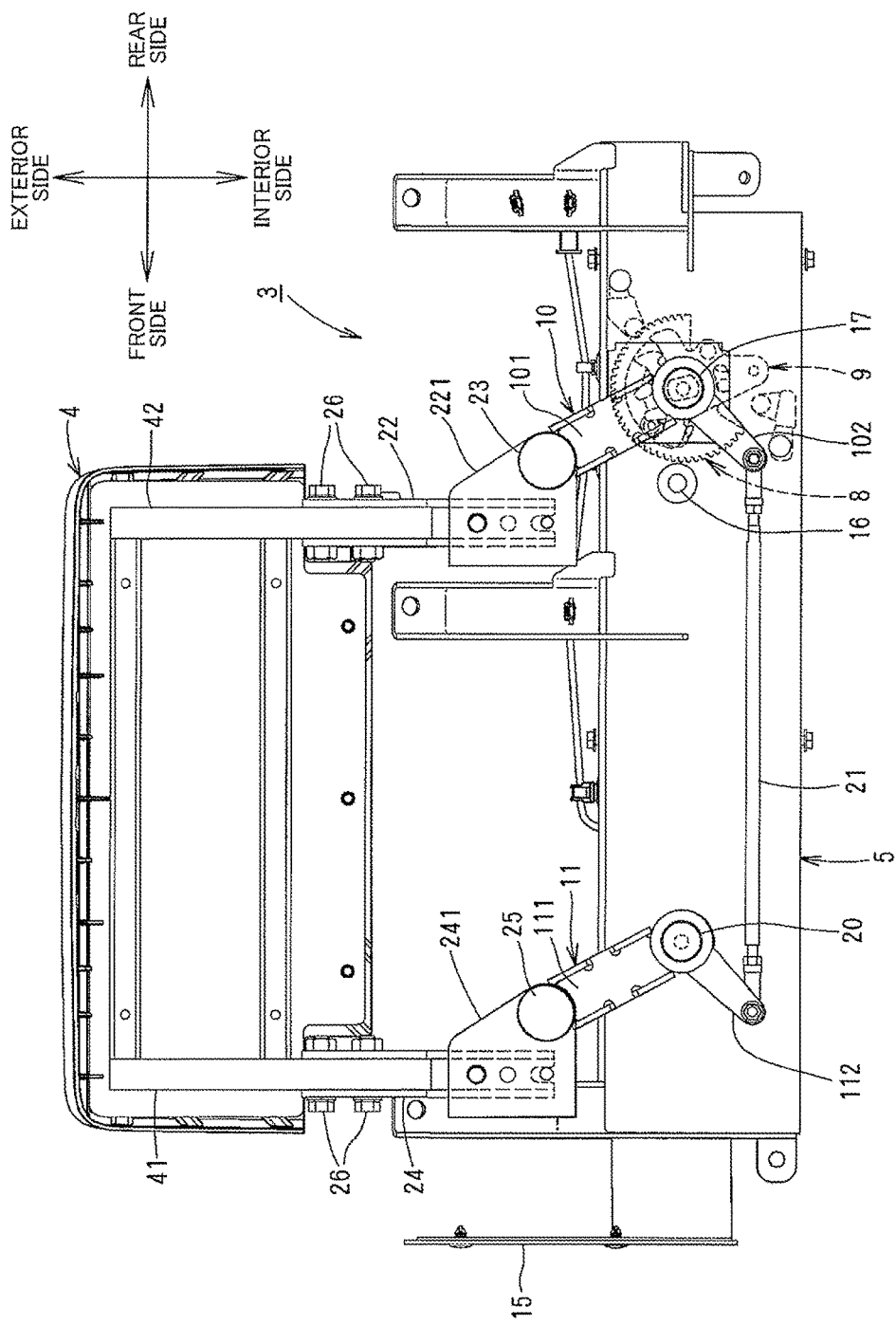
FIG. 6 is a bottom view of the electric step device when the step is positioned at an overhang position (or a protruding position).

FIG. 4 is a plan view of the electric step device 3. FIG. 5 is a bottom view of the electric step device 3 when the step 4 is positioned at the retraction position. FIG. 6 is a bottom view of the electric step device 3 when the step 4 is positioned at the overhang position. Here, right and left sides of FIGS. 4 to 6 indicate rear and front sides of the electric step device 3. An upper side of FIG. 4 and lower sides of FIGS. 5 and 6 indicate an interior side of the vehicle 1. A lower side of FIG. 4 and upper sides of FIGS. 5 and 6 indicate an exterior side of the vehicle 1.

Further, in FIG. 4, in order to explicitly illustrate elements or components (the step motor M2, the idle gear 7, the sector gear 8, the revolution lever 9, the retraction interlock lever 12, the overhang interlock lever 13, the retraction interlock detection switch SW3 and the overhang interlock detection switch SW4) disposed on an upper surface of the base plate 5, an after-mentioned protection cover 14 is not shown. Here, the upper surface of the base plate 5 is a surface that faces upward as shown in FIG. 3. Likewise, a lower surface of the base plate 5 is a surface that faces downward as shown in FIG. 3.

The cover 14 (see FIGS. 2 and 3) is fixed to the upper surface of the base plate 5. The cover 14 covers the elements or components disposed on the upper surface of the base plate 5. Further, a mud guard plate 15 extending in right and left directions is fixed to a front portion (a left portion in FIGS. 4 to 6) of the base plate 5. The mud guard plate 15 prevents adhesion of mud etc. spattering during travel of the vehicle to the step 4 when the step 4 is positioned at the retraction position. In addition, a cylindrical stopper 51 that limits a revolution range of the revolution lever 9, a retraction striker 52 with which the retraction interlock lever 12 can engage and an overhang striker 53 with which the overhang interlock lever 13 can engage, are fixed to the upper surface of the base plate 5.

The step motor M2 is disposed on the upper surface of the base plate 5. The step motor M2 is controlled by the control unit 100 mounted in a certain place of the vehicle body. Control of the step motor M2 will be explained later.

Figure 7:
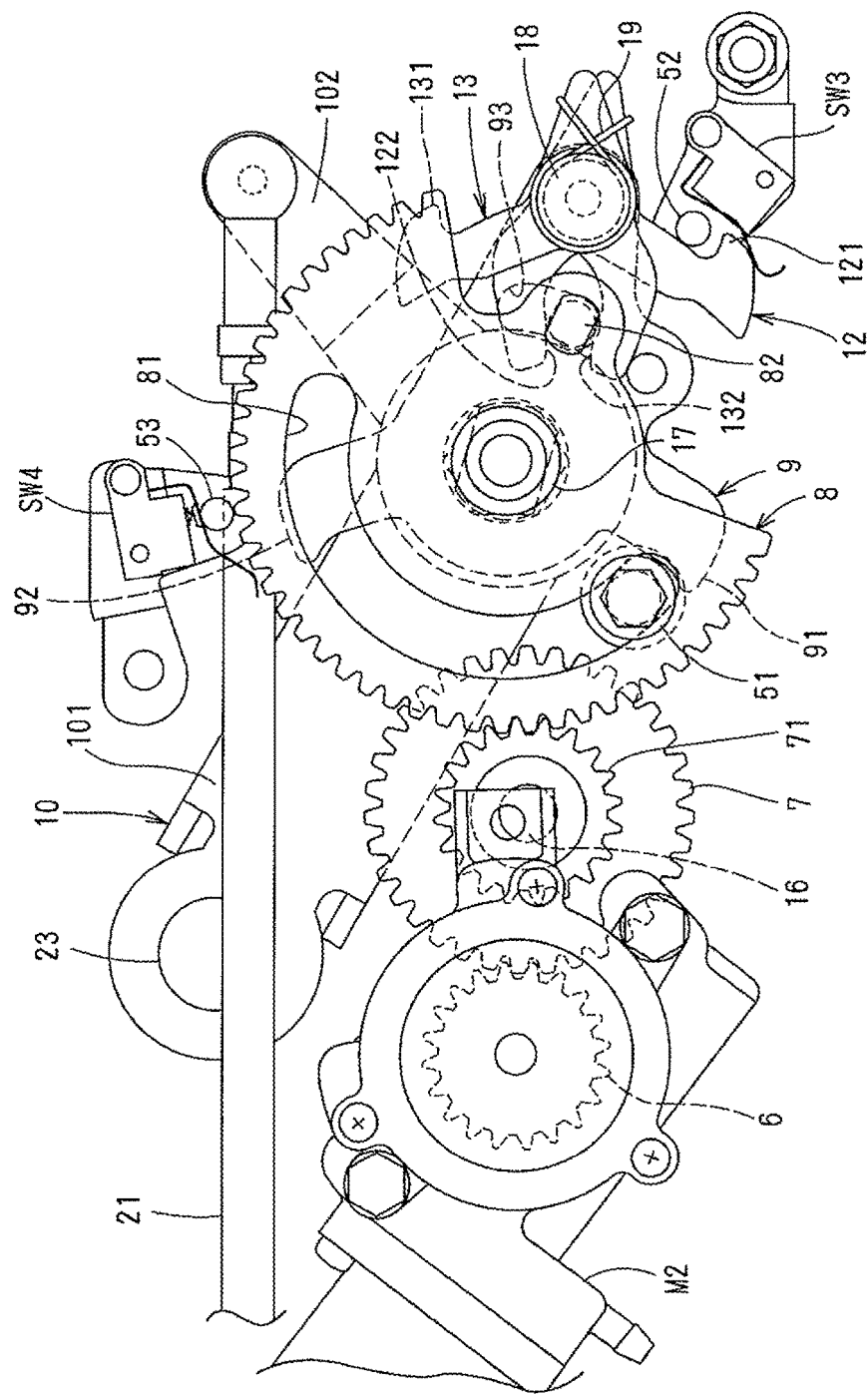
FIG. 7 is an enlarged plan view of an essential part of the electric step device when the step is positioned at the retraction position.
Figure 8:
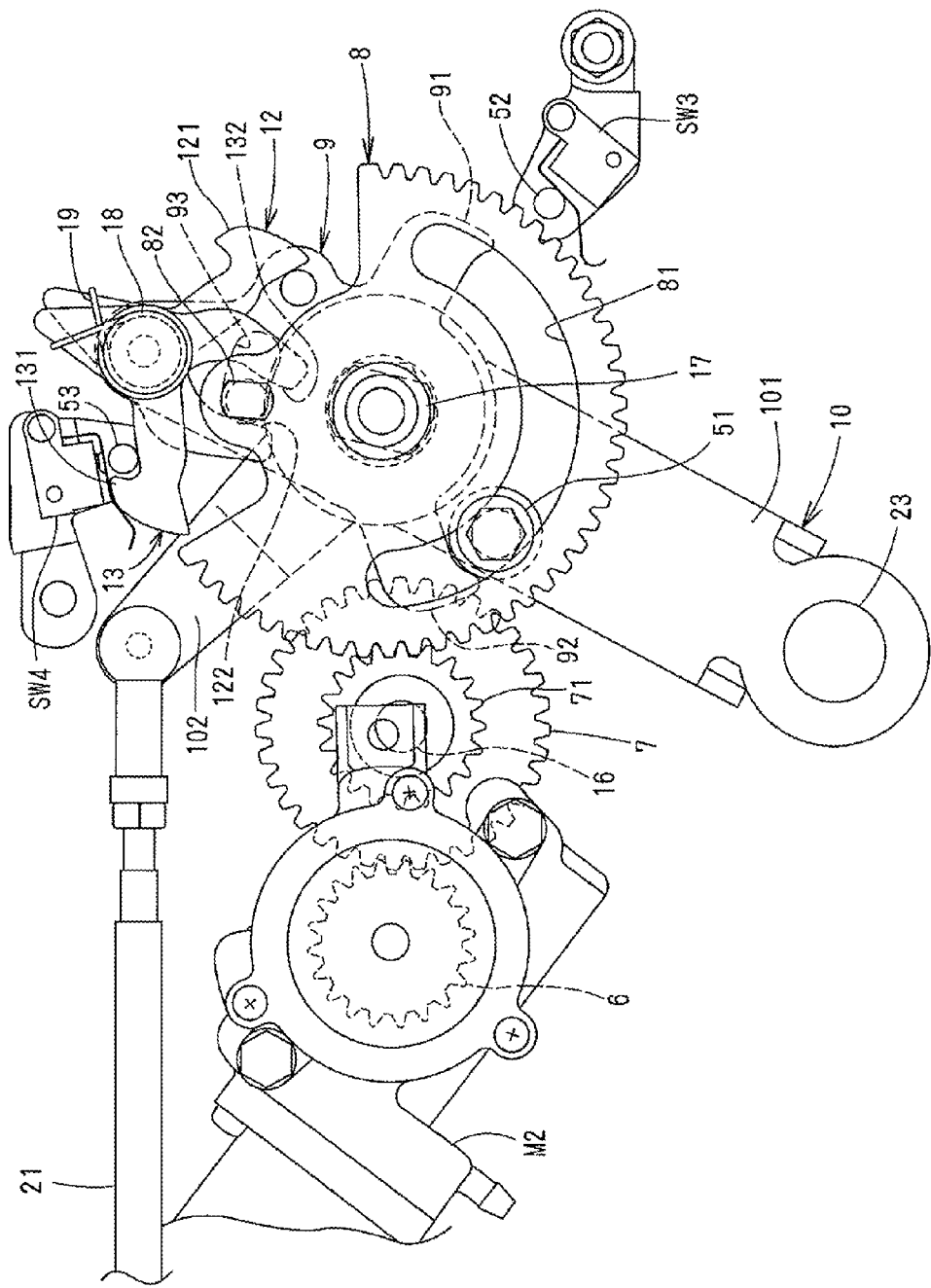
FIG. 8 is an enlarged plan view of the essential part of the electric step device when the step is positioned at the overhang position (or the protruding position).

FIG. 7 is an enlarged plan view of an essential part of the electric step device 3 when the step 4 is positioned at the retraction position. FIG. 8 is an enlarged plan view of the essential part of the electric step device 3 when the step 4 is positioned at the overhang position. Here, directions (clockwise and counterclockwise directions) explained in the present embodiment are defined with a plan view of the electric step device 3 being a reference.

The idle gear 7 is rotatably supported by a shaft 16 extending in an up-and-down direction (a vertical direction) on the upper surface of the base plate 5. The idle gear 7 engages with the output gear 6 and the sector gear 8 between the output gear 6 and the sector gear 8, thereby transmitting rotation of the step motor M2 to the sector gear 8.

The sector gear 8 is rotatably supported by a shaft 17 extending in the up-and-down direction (the vertical direction) on the upper surface of the base plate 5. The sector gear 8 has an arc-shaped opening 81 that is formed with the shaft 17 being a center and a cylindrical interlock actuating portion 82 that can contact the retraction interlock lever 12 and the overhang interlock lever 13 in the rotation direction. By a forward rotation of the step motor M2, the sector gear 8 rotates in a counterclockwise direction by a predetermined angle from the retraction position shown in FIG. 7 to the overhang position shown in FIG. 8. By a reverse rotation of the step motor M2, the sector gear 8 rotates in a clockwise direction from the overhang position to the retraction position. The stopper 51 is inserted in the arc-shaped opening 81 so that the arc-shaped opening 81 can move in the rotation direction relative to the stopper 51.

The revolution lever 9 is rotatably supported by the shaft 17 so as to rotate integrally with the shaft 17. The revolution lever 9 has a first contact portion 91 extending in a radial direction and a second contact portion 92 provided at a position spaced a predetermined angle in the rotation direction from the first contact portion 91. The revolution lever 9 is configured to revolve in the counterclockwise direction from the retraction position shown in FIG. 7 at which the first contact portion 91 contacts the stopper 51 from the clockwise direction and a further rotation of the revolution lever 9 is limited to the overhang position shown in FIG. 8 at which the second contact portion 92 contacts the stopper 51 from the counterclockwise direction and a further rotation of the revolution lever 9 is limited, or vice versa. Further, the revolution lever 9 has an arc-shaped insertion opening 93 having a predetermined length in the rotation direction with the shaft 17 being a center. The interlock actuating portion 82 is inserted in the insertion opening 93 with predetermined play in the rotation direction of the sector gear 8. With this configuration, the revolution lever 9 is connected to or coordinates with the sector gear 8 through the play in the rotation direction formed between the interlock actuating portion 82 and the insertion opening 93. When the sector gear 8 and the revolution lever 9 are positioned at the retraction position, the interlock actuating portion 82 contacts one end edge (a lower edge in FIG. 7) of the insertion opening 93. When the sector gear 8 and the revolution lever 9 are positioned at the overhang position, the interlock actuating portion 82 contacts the other end edge (a left edge in FIG. 8) of the insertion opening 93.

As described above, by the configuration in which the revolution lever 9 is connected to or coordinates with the sector gear 8 through the play in the rotation direction, in a case where the sector gear 8 rotates in the counterclockwise direction from the retraction position toward the overhang position by the step motor M2, first the sector gear 8 rotates from the retraction position by an initial angle that corresponds to the play in the rotation direction. With this initial rotation, as described later, an engagement between the retraction interlock lever 12 and the retraction striker 52 is released within a time period of the initial rotation, and the interlock actuating portion 82 contacts the other end edge (an upper edge in FIG. 7) of the insertion opening 93, then the interlock actuating portion 82 revolves the revolution lever 9 in the counterclockwise direction from the retraction position. Subsequently, the sector gear 8 and the revolution lever 9 rotate, and the second contact portion 92 of the revolution lever 9 contacts the stopper 51 from the counterclockwise direction, then the sector gear 8 and the revolution lever 9 stop at the overhang position.

Further, in a case where the sector gear 8 rotates in the clockwise direction from the overhang position toward the retraction position by the step motor M2, first the sector gear 8 rotates in the clockwise direction from the overhang position by the initial angle. With this initial rotation, as described later, an engagement between the overhang interlock lever 13 and the overhang striker 53 is released within a time period of the initial rotation, and the interlock actuating portion 82 contacts one end edge (a right edge in FIG. 8) of the insertion opening 93, then the interlock actuating portion 82 revolves the revolution lever 9 in the clockwise direction from the overhang position. Subsequently, the sector gear 8 and the revolution lever 9 rotate, and the first contact portion 91 of the revolution lever 9 contacts the stopper 51 from the clockwise direction, then the sector gear 8 and the revolution lever 9 stop at the retraction position.

The retraction interlock lever 12 and the overhang interlock lever 13 are each supported by a shaft 18 so as to independently revolve with respect to the revolution lever 9. A spring 19 is wound around the shaft 18, and one end of the spring 19 is hooked on or contacts the retraction interlock lever 12, and the other end of the spring 19 is hooked on or contacts overhang interlock lever 13. The spring 19 gives an urging force to the retraction interlock lever 12 in the counterclockwise direction, and gives an urging force to the overhang interlock lever 13 in the clockwise direction.

The retraction interlock lever 12 has a hook portion 121 that can engage with or fit to the retraction striker 52 and an arm portion 122 which the interlock actuating portion 82 can contact upon the initial rotation of the sector gear 8 in the counterclockwise direction. When the revolution lever 9 is positioned at the retraction position, the retraction interlock lever 12 is held to a state (hereinafter, called a "lock state") in which the hook portion 121 engages with or fits to the retraction striker 52 from the counterclockwise direction by the spring 19. Upon the initial rotation of the sector gear 8 in the counterclockwise direction, the interlock actuating portion 82 contacts the arm portion 122, and the retraction interlock lever 12 revolves on the shaft 18 in the clockwise direction against the urging force of the spring 19, then the hook portion 121 is released from the retraction striker 52, thereby allowing the rotation of the revolution lever 9 to the counterclockwise direction.

The overhang interlock lever 13 has a hook portion 131 that can engage with or fit to the overhang striker 53 and an arm portion 132 which the interlock actuating portion 82 can contact upon the initial rotation of the sector gear 8 in the clockwise direction. When the revolution lever 9 is positioned at overhang position, the overhang interlock lever 13 is held to a state (hereinafter, called a "lock state") in which the hook portion 131 engages with or fits to the overhang striker 53 from the clockwise direction by the spring 19. Upon the initial rotation of the sector gear 8 in the clockwise direction, the interlock actuating portion 82 contacts the arm portion 132, and the overhang interlock lever 13 revolves on the shaft 18 in the counterclockwise direction against the urging force of the spring 19, then the hook portion 131 is released from the overhang striker 53, thereby allowing the rotation of the revolution lever 9 to the clockwise direction.

When the retraction interlock lever 12 is in the lock state, the retraction interlock detection switch SW3 detects the lock state of the retraction interlock lever 12 and the retraction position of the step 4 by contacting a tip end of the hook portion 121, and this detection signal is sent to the control unit 100.

When the overhang interlock lever 13 is in the lock state, the overhang interlock detection switch SW4 detects the lock state of the overhang interlock lever 13 and the overhang position of the step 4 by contacting a tip end of the hook portion 131, and this detection signal is sent to the control unit 100.

The first link 10 is disposed under the lower surface of the base plate 5, and is fixed to the shaft 17 so as to be able to rotate integrally with the revolution lever 9. The first link 10 has a first arm 101 extending in a slanting direction between the front side and the interior side as shown in FIG. 5 (in a lower left direction in FIG. 5) and a second arm 102 extending in slanting direction between the rear side and the interior side as shown in FIG. 5 (in a lower right direction in FIG. 5). The first link 10 revolves integrally with the revolution lever 9 in the clockwise direction by a predetermined angle from the retraction position (a position shown in FIG. 5) to the overhang position (a position shown in FIG. 6), or vice versa. A top end of the first arm 101 is connected to a rear side bracket 221 that is rotatably supported by a shaft 23 extending in the up-and-down direction (the vertical direction). A rear side first stay 22 extending in the exterior side is secured to the bracket 221.

The second link 11 is disposed under the lower surface of the base plate 5, and is supported by a shaft 20 spaced a predetermined distance toward the front side from the haft 17 and extending in the up-and-down direction (the vertical direction). The second link 11 has a first arm 111 and a second arm 112 whose shapes are the same as those of the first link 10. The second arm 112 is connected to the second arm 102 of the first link 10 through a connecting rod 21 extending in front and rear directions, then the second arm 112 can revolve to the retraction position shown in FIG. 5 and to the overhang position shown in FIG. 6 in synchronization with the first link 10. The first arm 111 is connected to a front side bracket 241 that is rotatably supported by a shaft 25 extending in the up-and-down direction (the vertical direction). A front side first stay 24 extending in the exterior side is secured to the bracket 241.

The step 4 has such a plate shape that passenger's foot (or feet) is easily put on the step 4. As shown in FIGS. 5 and 6, a front side second stay 41 and a rear side second stay 42 are fixed to a lower surface of the step 4. An end portion of the front side second stay 41 is connected to the front side first stay 24 with bolts 26, and an end portion of the rear side second stay 42 is connected to the rear side first stay 22 with bolts 26. The step 4 can therefore move from the retraction position to the overhang position, or vice versa, by and according to revolution of the first and second links 10 and 11. Here, the step 4 is held at the retraction position and the overhang position by resistance or drag of a deceleration mechanism that decelerates rotation of the step motor M2 and transmits it to the sector gear 8. Also, the retraction interlock lever 12 and the overhang interlock lever 13 have the function of subserviently or supplementarily restraining (or holding) the step 4 at the retraction position and the overhang position by engaging with the retraction striker 52 and the overhang striker 53 respectively.

The step 4 is provided with a weight detection sensor SW5 (see FIG. 9) that detects a load of the step 4 on which the passenger's foot (or feet) is put or the step 4 which the passenger's foot (or feet) contacts and an obstruction detection sensor SW6 (see FIG. 9) that detects an occurrence or a state in which the step 4 contacts or collides with obstructions or the step 4 approaches the obstructions. A detection signal detected by each of the weight detection sensor SW5 and the obstruction detection sensor SW6 is sent to the control unit 100. It is preferable that the weight detection sensor SW5 is set on an upper surface of the step 4, and the obstruction detection sensor SW6 is set at a side surface of the step 4.

The electric step device 3 of the present embodiment is configured so that, in order for the electric step device 3 to be applied to a special modification vehicle equipped with side-aeroparts on a vehicle lower side, a position of the step 4 can be adjusted so that an overhang amount of the step 4 from the vehicle body is greater than that of a normal position (the position shown in each drawing). This position adjustment can be achieved by a configuration in which, as can be understood from FIG. 3, for instance, three adjustment holes 411 and 421 are formed along the vehicle interior and exterior direction at the second stays 41 and 42, and two bolt holes 222 and 242 in which bolts 26 are inserted are formed along the vehicle interior and exterior direction at the first stays 22 and 24.

In a case where the step 4 is used at the normal position, two bolts 26 inserted in the bolt holes 222 and 242 are inserted in exterior side adjustment holes 411 and 421 (right side adjustment holes in FIG. 3) and middle adjustment holes 411 and 421 of the three adjustment holes 411 and 421, and the first stays 22 and 24 are secured to the second stays 42 and 41 respectively with the bolts 26. In a case where the step 4 is used for the special modification vehicle, two bolts 26 inserted in the bolt holes 222 and 242 are inserted in interior side adjustment holes 411 and 421 (left side adjustment holes in FIG. 3) and middle adjustment holes 411 and 421 of the three adjustment holes 411 and 421, and the first stays 22 and 24 are secured to the second stays 42 and 41 respectively with the bolts 26. With this, the position of the step 4 can be set to an outer side with respect to the normal position.

Next, operation of the electric step device 3 will be explained. Although a detailed explanation will be described later, in the present embodiment, an overhang drive control that moves the step 4 from the retraction position to the overhang position is executed by or according to an event or occurrence of an opening operation of the slide door 2 (when the door opening and closure detection switch SW1 detects an opening movement of the slide door 2, or when the handle operation detection switch SW2 detects an opening operation of the door operation handle 2A). A retraction drive control that moves the step 4 from the overhang position to the retraction position is executed by or according to an event or occurrence of a closure operation of the slide door 2 having been at a full open position at a predetermined timing. This will be explained in detail later.

In a case where the slide door 2 is closed, the step 4 is retracted at the retraction position. In this retraction state, especially as shown in FIGS. 5 and 7, the sector gear 8, the revolution lever 9 and the first and second links 10 and 11 stop or are held at the respective retraction positions, and the step 4 is held in the lock state by the retraction interlock lever 12 forced by the urging force of the spring 19.

When the step motor M2 rotates forward (forward rotation) in the above retraction state, this rotation is transmitted to the sector gear 8 through the output gear 6 and the idle gear 7. The sector gear 8 then rotates in the counterclockwise direction from the retraction position. At this time, by the initial rotation of the sector gear 8, the interlock actuating portion 82 contacts the arm portion 122 of the retraction interlock lever 12, then revolves the retraction interlock lever 12 in the clockwise direction against the urging force of the spring 19.

The hook portion 121 of the retraction interlock lever 12 having revolved in the clockwise direction is then released from the retraction striker 52, thereby allowing the rotation of the revolution lever 9 to the counterclockwise direction. When the sector gear 8 further rotates in the counterclockwise direction as the initial rotation, the interlock actuating portion 82 contacts one end edge of the insertion opening 93 of the revolution lever 9, then the revolution lever 9 rotates in the counterclockwise direction together with the sector gear 8. When the sector gear 8 and the revolution lever 9 move (rotate) to the overhang position, the hook portion 131 of the overhang interlock lever 13 surmounts or overstrides the overhang striker 53, and as shown in FIG. 8, the overhang interlock lever 13 is in the lock state in which the overhang interlock lever 13 engages with the overhang striker 53, then the movement of the step 4 to the overhang position is completed.

When the step motor M2 rotates backward (reverse rotation) in a state in which the step 4 is at the overhang position, this rotation is transmitted to the sector gear 8 through the output gear 6 and the idle gear 7. The sector gear 8 then rotates in the clockwise direction from the overhang position. At this time, by the initial rotation of the sector gear 8, the interlock actuating portion 82 contacts the arm portion 132 of the overhang interlock lever 13, then revolves the overhang interlock lever 13 in the counterclockwise direction against the urging force of the spring 19.

The hook portion 131 of the overhang interlock lever 13 having revolved in the counterclockwise direction is then released from the overhang striker 53, thereby allowing the rotation of the revolution lever 9 to the clockwise direction. When the sector gear 8 further rotates in the clockwise direction as the initial rotation, the interlock actuating portion 82 contacts the other end edge of the insertion opening 93 of the revolution lever 9, then the revolution lever 9 rotates in the clockwise direction together with the sector gear 8. When the sector gear 8 and the revolution lever 9 move (rotate) to the retraction position, the hook portion 121 of the retraction interlock lever 12 surmounts or overstrides the retraction striker 52, and as shown in FIG. 7, the retraction interlock lever 12 is in the lock state in which the retraction interlock lever 12 engages with the retraction striker 52, then the movement of the step 4 to the retraction position is completed.

Figure 9:
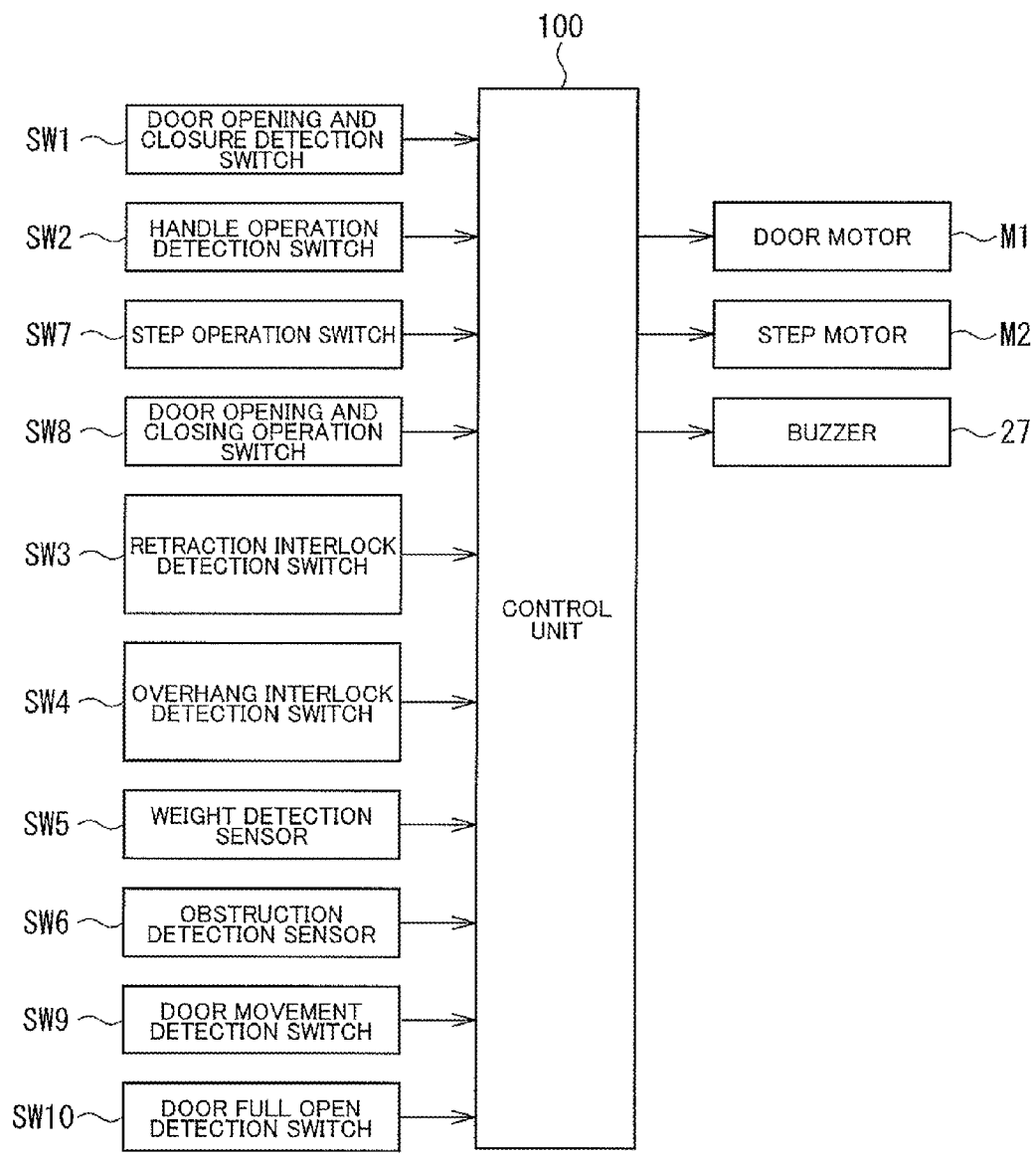
FIG. 9 is a block diagram showing an example of a circuit configuration of a control unit.

FIG. 9 is a block diagram showing an example of a circuit configuration of the control unit 100. In the control unit 100, a microcomputer for controlling the electric step device 3 and the electric door opening and closing device according to program is equipped. The microcomputer is formed from, for instance, ROM for storing the program for the electric step device 3 and the electric door opening and closing device, RAM used as work memory and CPU and I/O port section for performing control operation according to the program.

Further, the control unit 100 has an input driver circuit (not shown) and an output driver circuit (not shown). The input driver circuit sends each signal of the door opening and closure detection switch SW1, the handle operation detection switch SW2, the retraction interlock detection switch SW3, the overhang interlock detection switch SW4, the weight detection sensor SW5, the obstruction detection sensor SW6, a step operation switch SW7 for the electric step device 3 which is provided at a certain position(s) in the vehicle interior, a door opening and closing operation switch SW8 for the electric door opening and closing device which is provided at driver's seat and a certain position(s) of the vehicle body, a remote control switch (not shown) which a driver carries, a door movement detection switch SW9 which detects a movement of the slide door 2 and a door full open detection switch SW10 which detects a full open position of the slide door 2 to the microcomputer. The output driver circuit drives the door motor M1, the step motor M2 and a buzzer (or a beeper) 27 provided at a certain position of the vehicle body, according to a command from the microcomputer.

The door movement detection switch SW9 is formed by, for instance, a rotation sensor such as a rotary encoder provided at the door motor M1 or at a rotary portion of a deceleration mechanism connected to the door motor M1.

The control unit 100 calculates a pulse signal outputted from the door movement detection switch SW9 when the slide door 2 opens or closes, and detects and judges a position of the slide door 2, a speed of the movement of the slide door 2 and a movement direction of the slide door 2 at that time.

As a control of the electric door opening and closing device, the control unit 100 inputs an opening operation signal from the handle operation detection switch SW2, the door opening and closing operation switch SW8 or the remote control switch, and executes a door opening drive control of the electric door opening and closing device to move the slide door 2 in a door opening direction. Further, the control unit 100 inputs a closing operation signal from the handle operation detection switch SW2, the door opening and closing operation switch SW8 or the remote control switch, and executes a door closure drive control of the electric door opening and closing device to move the slide door 2 in a door closing direction.

As a normal control of the electric step device 3, when the retraction interlock detection switch SW3 detects that the step 4 is positioned at the retraction position, the control unit 100 executes the overhang drive control of the step motor M2 to move the step 4 from the retraction position to the overhang position by or according to an event or occurrence of the opening operation of the slide door 2 (when the door opening and closure detection switch SW1 detects the opening movement of the slide door 2, or when the handle operation detection switch SW2, the door opening and closing operation switch SW8 or the remote control switch detects the opening operation of the slide door 2). Further, when the retraction interlock detection switch SW3 detects that the step 4 is positioned at the overhang position, the control unit 100 executes the retraction drive control of the step motor M2 to move the step 4 from the overhang position to the retraction position by or according to an event or occurrence of the closure operation of the slide door 2 at a predetermined timing.

Furthermore, as an abnormality control (or an exceptional control) for the electric step device 3, the control unit 100 executes a retraction drive inoperable control that makes the retraction drive control inoperable and an abnormality stop and reverse control that stops the overhang drive control and the retraction drive control or reverses the overhang drive control and the retraction drive control, or vice versa.

As the retraction drive inoperable control, in order to ensure safety of the passengers, for instance, it is a control that, in a case where the weight detection sensor SW5 detects the load of the step 4 positioned at the overhang position on which the passenger's foot (or feet) is put and so on, even if the event in which the step 4 is moved to the retraction position by the closure operation of the slide door 2 occurs, disables the retraction drive control. In this case, at a time point when the weight detection sensor SW5 does not detect the load of the step 4, the retraction drive control is started.

As the abnormality stop and reverse control, it is an emergency stop control that, in a case where the obstruction detection sensor SW6 detects obstructions or the weight detection sensor SW5 detects the load of the step 4 during execution of the overhang drive control or the retraction drive control by the control unit 100, immediately stops the overhang drive control or the retraction drive control. Further, it is a reverse control that, in a case where the closure operation of the slide door 2 is detected during execution of the overhang drive control by the control unit 100, stops the overhang drive control or switches (changes) the control from the overhang drive control to the retraction drive control. In addition, it is a reverse control that, in a case where the opening operation of the slide door 2 is detected during execution of the retraction drive control by the control unit 100, stops the retraction drive control or switches (changes) the control from the retraction drive control to the overhang drive control.

In the present embodiment, the closure operation of the slide door 2 having been positioned at the full open position is the closure operation of the door operation handle 2A. A timing at which the retraction drive control is executed is a timing at which the door movement detection switch SW9 detects a closing movement of the slide door 2. However, the closure operation and the timing of the retraction drive control are not limited to these.

Regarding the closure operation of the slide door 2 having been positioned at the full open position, in addition to the closure operation by the door operation handle 2A, it is a closure operation by the remote control switch or the door opening and closing operation switch SW8.

Regarding the timing at which the retraction drive control is executed, instead of the timing at which the door movement detection switch SW9 detects the closing movement of the slide door 2, it could be a timing at which the handle operation detection switch SW2 detects the closure operation of the door operation handle 2A or a timing immediately afterwards, or a timing at which the closure operation of the remote control switch or the door opening and closing operation switch SW8 is done or a timing immediately afterwards.

Further, as a timing at which the retraction drive control is started, the following timing is conceivable. For instance, when a time required for the slide door 2 to reach the closure position from the full open position by the electric door opening and closing device is T1 and a time required for the step 4 to move from the overhang position to the retraction position is T2, normally, a relationship between T1 and T2 is "T1>T2". From this relationship, if a timing at which the retraction drive control is started is set within a time period of "T1-T2" from a time point of the detection of the closure operation of the slide door 2 or is set within a time period required for the slide door 2 to reach a position where the slide door 2 moves by a distance corresponding to the time "T1-T2" from the full open position, in either case, it is possible to move the step 4 to the retraction position before the slide door 2 reaches the closure position.

Therefore, as long as the start timing of the retraction drive control executed by the control unit 100 with the closure operation of the slide door 2 being an event (or, by or according to an event or occurrence of the closure operation of the slide door 2) is set before the slide door 2 reaches the closure position from the full open position, either timing is proper.

Further, the control unit 100 executes a speed control of the retraction drive control, which can surely move the step 4 to the retraction position before the slide door 2 reaches the closure position from the full open position even if a stop condition of the vehicle 1 is changed.

As an example of the speed control of the retraction drive control, in a case where a closing speed of the slide door 2 is faster than a normal speed due to the fact that the vehicle 1 stops with a vehicle front being inclined downward, the control unit 100 calculates the closing speed of the slide door 2, and performs a PWM control by setting a duty ratio according to the calculated closing speed so that a rotation speed of the step motor M2 is higher than a normal speed.

Further, as another example of the speed control of the retraction drive control, an attitude of the vehicle 1 is detected by an angle sensor mounted in the vehicle, and the rotation speed of the step motor M2 is controlled according to an inclination angle of the vehicle detected by the angle sensor. In this case, when the angle sensor detects the vehicle attitude inclining downward, the control unit 100 controls the rotation speed of the step motor M2 so that the rotation speed of the step motor M2 is higher than the normal speed, whereas when the angle sensor detects the vehicle attitude inclining upward, the control unit 100 controls the rotation speed of the step motor M2 so that the rotation speed of the step motor M2 is lower than the normal speed.

In the present embodiment, an example in which the control unit 100 controls both of the electric step device 3 and the electric door opening and closing device is explained. However, instead of this, the control unit 100 could be a unit dedicated to the electric step device 3, and a door control unit for controlling the electric door opening and closing device could be provided separately. In this case, a detection signal from each of the door opening and closure detection switch SW1 relating to the operation and detection of the electric door opening and closing device, the handle operation detection switch SW2, the door opening and closing operation switch SW8, the door movement detection switch SW9 and the door full open detection switch SW10 is sent to the door control unit, and the door control unit sends each information to the control unit 100.

Figure 10:
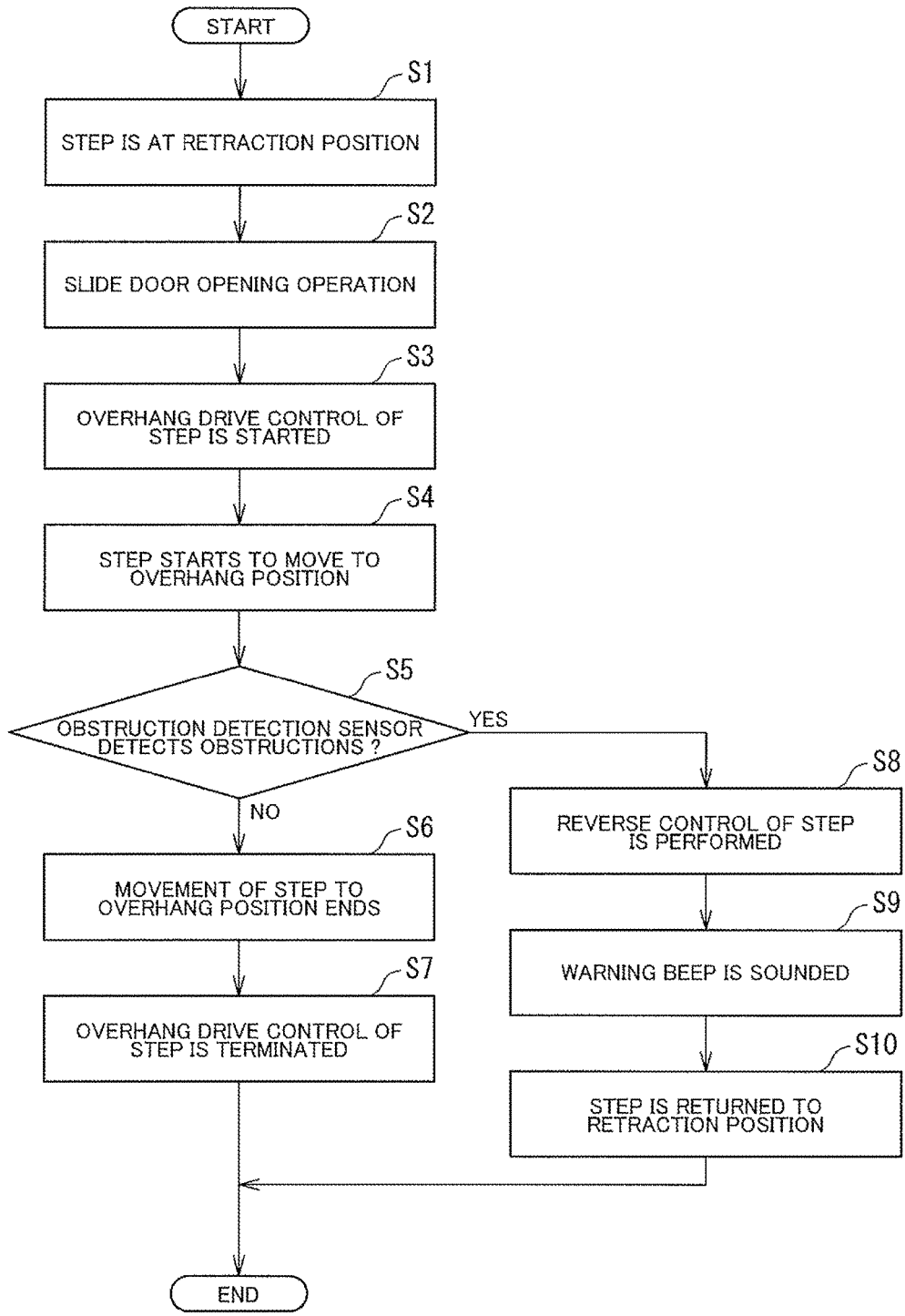
FIG. 10 is a flow chart to explain an overhang drive control (or a protruding drive control).

Next, operation of the electric step device 3 and control of the control unit 100 will be explained using flow charts. FIG. 10 is a flow chart to explain the overhang drive control for moving the step 4 from the retraction position to the overhang position. FIG. 11 is a flow chart to explain the retraction drive control for moving the step 4 from the overhang position to the retraction position. In the following explanation using the flow charts shown in FIGS. 10 and 11, to simplify the explanation, the reverse control of the abnormality stop and reverse control and the speed control of the retraction drive control, which are described above, are omitted.

Here, in order to avoid confusion with each step in the flow charts in FIGS. 10 and 11 and the step 4 of the electric step device 3, in the following explanation, each step in the flow charts is denoted by step S1, step S2, . . . S18.

First, the overhang drive control of the step 4 and an operation associated with the overhang drive control will be explained with reference to FIG. 10. When the slide door 2 is the closure position, the step 4 is held at the retraction position (step S1). In this state, since the step 4 is held at the retraction position by the resistance or the drag of the deceleration mechanism, there is no case where the position of the step 4 is shifted due to vibration during vehicle travel.

When the opening operation of the slide door 2 of the door operation handle 2A or the door opening and closing operation switch SW8 is done in order to open the slide door 2 (step S2), the control unit 100 executes an opening drive control of the door motor M1 of the electric door opening and closing device on the basis of a door opening operation detection signal of the handle operation detection switch SW2 or the door opening and closing operation switch SW8. With this control, the slide door 2 moves to open, then the door opening and closure detection switch SW1 sends a door opening signal to the control unit 100.

The control unit 100 starts the overhang drive control of the step motor M2 by and according to the opening operation of the slide door 2 (step S3). With this control, the step 4 starts to move from the retraction position toward the overhang position (step S4). Here, in a case where the weight detection sensor SW5 detects the load and/or the obstruction detection sensor SW6 detects obstructions although these flow charts are omitted, the control unit 100 does not start the overhang drive control.

If the obstruction detection sensor SW6 does not detect the obstructions (and/or the weight detection sensor SW5 does not detect the load) until the step 4 reaches the overhang position (step S5), the step 4 continues moving toward the overhang position. Subsequently, the step 4 moves to the overhang position (step S6), and the overhang interlock detection switch SW4 detects the lock state of the overhang interlock lever 13. With this detection, the control unit 100 stops the step motor M2 and terminates the overhang drive control (step S7).

On the other hand, at step S5, if an abnormal state is detected before the step 4 reaches the overhang position by the fact that the weight detection sensor SW5 detects the load and/or the obstruction detection sensor SW6 detects obstructions, the control unit 100 performs the reverse control of the step motor M2 from the overhang drive control to the retraction drive control (step S8). And also, in order to notify existence etc. of the obstructions, the control unit 100 drives the buzzer (or the beeper) 27 and a warning beep is sounded (step S9). With this control, the step 4 is reversed from a position at which the abnormality is detected, and is returned to and stops at the retraction position (step S10), then the reverse control of the step 4 is terminated.

Next, the retraction drive control of the step 4 and an operation associated with the retraction drive control will be explained with reference to FIG. 11. When the slide door 2 is the full open position, the step 4 is held at the overhang position (step S11). In this state, since the step 4 is held at the overhang position by the resistance or the drag of the deceleration mechanism, there is no case where the position of the step 4 is shifted due to vibration caused when getting on or out of the vehicle.

When the closure operation of the slide door 2, i.e. the closure operation of the door operation handle 2A or the door opening and closing operation switch SW8, is done in order to close the slide door 2 (step S12), the control unit 100 executes a closure drive control of the door motor M1 of the electric door opening and closing device on the basis of a door closure operation detection signal of the handle operation detection switch SW2 or the door opening and closing operation switch SW8. With this control, the slide door 2 starts to move from the full open position to the door closing direction, then the door movement detection switch SW9 detects the closing movement of the slide door 2 and sends a door closing movement detection signal to the control unit 100.

If the weight detection sensor SW5 does not detect the load (and/or the obstruction detection sensor SW6 does not detect the obstructions) at step S13, the control unit 100 starts the retraction drive control of the step motor M2 with the closure operation of the slide door 2 being an event (or, by or according to an event or occurrence of the closure operation of the slide door 2) (step S14), and the step 4 starts to move to the retraction position (step S15).

Subsequently, when a movement of the step 4 to the retraction position is completed (step S16), the retraction interlock detection switch SW3 detects the lock state of the retraction interlock lever 12. With this detection, the control unit 100 stops the step motor M2 and terminates the retraction drive control (step S17). Here, in a case where the weight detection sensor SW5 detects the load and/or the obstruction detection sensor SW6 detects obstructions during execution of the retraction drive control by the control unit 100, i.e. during the progress of the movement of the step 4 toward the retraction position, the control unit 100 stops (interrupts or breaks) the retraction drive control. When the detection of the weight detection sensor SW5 and/or the obstruction detection sensor SW6 is removed, the control unit 100 restarts the retraction drive control.

After the completion of the movement of the step 4 to the retraction position, the slide door 2 reaches the closure position (step S18), and the door opening and closure detection switch SW1 detects that the slide door 2 reaches the closure position. With this detection, the control unit 100 stops the door closure drive control, then a series of operation is terminated.

On the other hand, at step S13, if the weight detection sensor SW5 detects the load and/or the obstruction detection sensor SW6 detects obstructions, the control unit 100 cancels the closure operation of the slide door 2, and does not start the retraction drive control of the step motor M2 (step S19). Therefore, the movement of the step 4 to the retraction position is disabled with the step 4 held at the overhang position.

Afterwards, if the weight detection sensor SW5 does not detect the load and/or the obstruction detection sensor SW6 does not detect obstructions, the control unit 100 starts the retraction drive control of the step 4 after a lapse of a predetermined time in order to ensure safety (step S21), then a routine proceeds to step S15.

Here, in a case where the routine proceeds from step S21 to step S15, depending on a position of the slide door 2 when the retraction drive stop control is carried out, the step 4 does not necessarily reach the retraction position before the slide door 2 reaches the closure position.

From the foregoing, the present invention can include all design modifications and equivalents belonging to the technical scope of the present invention, as follows.

(a) The door is a swing-type door.

(b) When the vehicle is travelling (at a predetermined speed or more) or when a shift lever is at a position except a parking range, in order to ensure safety, the overhang drive control of the step 4 is forbidden.

(c) In a case where the step 4 is positioned at the overhang position, the control unit 100 controls the vehicle so that the vehicle cannot start, then by moving the step 4 to the retraction position, the start of the vehicle is permitted. With this control, it is possible to prevent the step 4 overhanging from the vehicle body from contacting or colliding with obstructions during the travel.

(d) The slide door 2 is a manual or a hand-operated slide door that can open and close by a hand-operation. In this case, an electric door opening and closing device without the door motor M1 is mounted in the vehicle, and a switch for detecting opening and closing speeds of the slide door 2, a movement direction of the slide door 2 and a position of the slide door 2 is provided at this electric door opening and closing device.

(e) In a case where the slide door 2 stops at some middle position without reaching the closure position when moving in the door closing direction from the full open position, wherever the step 4 is positioned, the control unit 100 moves the step 4 to the overhang position. With this control, even when the slide door 2 is positioned at a half-opening position, the step 4 is necessarily moved to the overhang position.

(f) Movement speeds of the step 4 to the overhang position and the retraction position can be customized by a user.

(g) The electric step device 3 is mounted under the floor of the vehicle body where a front door is provided. This is effective at mounting the electric step device 3 in a vehicle whose seat position is high.

(h) The above (a) to (g) are combined together as necessary.

The present invention includes the following structure or configuration of the electric step control device, and has the following effects.

(1) An electric step control device for a vehicle, the vehicle having a step (4) provided movably by power of a motor (M2) from a retraction position where the step (4) is retracted under a vehicle body to an overhang position where the step (4) appears from the vehicle body or vice versa according to an opening and closure operation of a door (2), the control device comprises: a control unit (100) configured to execute an overhang drive control that moves the step (4) from the retraction position to the overhang position by the power of the motor (M2) according to an occurrence of the opening operation of the door (2) having been at a closure position, and start a retraction drive control that moves the step (4) from the overhang position to the retraction position by the power of the motor (M2) according to an occurrence of the closure operation of the door (2) having been at a full open position at a predetermined timing before the door (2) reaches the closure position.

According to the above configuration, since the retraction drive control to move the step (4) to the retraction position starts at a predetermined timing before the door (2) reaches the closure position, it is possible to move the step (4) to the retraction position before the door (2) reaches the closure position, thereby preventing the step (4) from colliding with the obstructions at a vehicle start.

In this case, as a closure operation of the door (2) having been at the full open position, it is a closure operation by the door operation handle (2A) provided at the door (2), the remote control switch which a driver carries or the door opening and closing operation switch (SW8) provided at a certain position(s) of the vehicle body.

Further, as the predetermined timing at which the retraction drive control starts, it is a timing at which the closure operation of the remote control switch, the door operation handle (2A) or the door opening and closing operation switch (SW8) is done or a timing immediately afterwards. Or, it is a timing at which the door (2) starts to move to the door closing direction from the full open position, a predetermined time elapses after the door (2) starts to move, or the door (2) moves by a predetermined distance to the door closing direction.

(2) In the electric step control device for the vehicle of (1), the control unit (100) is configured to execute a speed control of the retraction drive control according to a closing speed of the door (2).

According to the above configuration, even if the closing speed of the door (2) is faster than a normal speed, it is possible to move the step (4) to the retraction position before the door (2) reaches the closure position.

(3) In the electric step control device for the vehicle of (1), the control unit (100) is configured to, during execution of the retraction drive control, execute a retraction drive stop control that stops the retraction drive control or execute a reverse control that changes the retraction drive control to the overhang drive control according to an opening operation detection signal of the door (2).

According to the above configuration, even during the progress of the movement of the step (4) toward the retraction position, by performing the opening operation of the door (2), the step (4) can be stopped or moved to the overhang position.

(4) In the electric step control device for the vehicle of (1), the control unit (100) is configured to, during execution of the overhang drive control, execute an overhang drive stop control that stops the overhang drive control or execute a reverse control that changes the overhang drive control to the retraction drive control according to a closure operation detection signal of the door (2).

According to the above configuration, even during the progress of the movement of the step (4) toward the overhang position, by performing the closure operation of the door (2), the step (4) can be stopped or moved to the retraction position.

(5) In the electric step control device for the vehicle of (1), the control unit (100) is configured to stop the retraction drive control or the overhang drive control when a weight detection sensor (SW5) provided at the step (4) detects a load during execution of the retraction drive control or the overhang drive control.

According to the above configuration, since the step (4) stops when passenger's foot (or feet) contacts the step (4) during the progress of the movement of the step (4), it is possible to ensure safety when getting on or out of the vehicle.

(6) In the electric step control device for the vehicle of (1), the control unit (100) is configured not to start the retraction drive control or the overhang drive control when a weight detection sensor (SW5) provided at the step (4) detects a load.

According to the above configuration, since the step (4) does not start to move when a weight detection sensor (SW5) provided at the step (4) detects a load, it is possible to ensure safety when getting on or out of the vehicle.

The entire contents of Japanese Patent Application No. 2016-158842 filed on Aug. 12, 2016 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An electric step control device for a vehicle, the vehicle having a step provided movably by power of a motor from a retraction position where the step is retracted under a vehicle body to an overhang position where the step projects from the vehicle body or vice versa according to an opening and closure operation of a door, the control device comprising:
a control unit configured to
execute an overhang drive control that moves the step from the retraction position to the overhang position by the power of the motor according to an occurrence of the opening operation of the door, the door having been at a closure position,
start a retraction drive control that moves the step from the overhang position to the retraction position by the power of the motor according to an occurrence of the closure operation of the door having been at a full open position at a predetermined timing before the door reaches the closure position, and
complete movement of the step to the retraction position before the door reaches the closure position.

2. The electric step control device for the vehicle as claimed in claim 1, wherein:
the control unit is configured to execute a speed control of the retraction drive control according to a closing speed of the door.

3. The electric step control device for the vehicle as claimed in claim 1, wherein:
the control unit is configured to, during execution of the retraction drive control, execute a retraction drive stop control that stops the retraction drive control or execute a reverse control that changes the retraction drive control to the overhang drive control according to an opening operation detection signal of the door.

4. The electric step control device for the vehicle as claimed in claim 1, wherein:
the control unit is configured to, during execution of the overhang drive control, execute an overhang drive stop control that stops the overhang drive control or execute a reverse control that changes the overhang drive control to the retraction drive control according to a closure operation detection signal of the door.

5. The electric step control device for the vehicle as claimed in claim 1, wherein:
the control unit is configured to stop the retraction drive control or the overhang drive control when a weight detection sensor provided at the step detects a load during execution of the retraction drive control or the overhang drive control.

6. The electric step control device for the vehicle as claimed in claim 1, wherein:
the control unit is configured not to start the retraction drive control or the overhang drive control when a weight detection sensor provided at the step detects a load.

7. The electric step control device for the vehicle as claimed in claim 1, wherein:
the control unit is configured to stop the retraction drive control after completion of the movement of the step to the retraction position.

8. The electric step control device for the vehicle as claimed in claim 2, wherein the speed control comprises controlling the motor based on at least an inclination angle of the vehicle.

9. An electric step control device for a vehicle, the vehicle having a step provided movably by power of a motor from a retraction position where the step is retracted under a vehicle body to an overhang position where the step projects from the vehicle body or vice versa according to an opening and closure operation of a door, the control device comprising:
a control unit configured to
execute an overhang drive control that moves the step from the retraction position to the overhang position by the power of the motor according to an occurrence of the opening operation of the door, the door having been at a closure position,
start a retraction drive control that moves the step from the overhang position to the retraction position by the power of the motor according to an occurrence of the closure operation of the door having been at a full open position at a predetermined timing before the door reaches the closure position, and
execute a speed control of the retraction drive control according to a closing speed of the door.

* * * * *